United States Patent [19]

Sunohara

[11] 4,266,641
[45] May 12, 1981

[54] LOOK-UP TORQUE CONVERTER WITH COMPACT ARRANGEMENT OF DAMPER

[75] Inventor: Yoshio Sunohara, Yokohama, Japan

[73] Assignee: Nissan Motor Company, Limited, Yokohama, Japan

[21] Appl. No.: 23,373

[22] Filed: Mar. 23, 1979

[30] Foreign Application Priority Data

Apr. 4, 1978 [JP] Japan .................... 53-38850

[51] Int. Cl.³ .................... F16D 3/66; F16D 45/02; F16D 33/00
[52] U.S. Cl. .................... 192/3.28; 192/106.2
[58] Field of Search .................... 192/3.28, 3.29, 3.3, 192/3.31, 106.1, 106.2, 3.28, 106.1, 106.2

[56] References Cited

U.S. PATENT DOCUMENTS

| 2,694,948 | 11/1954 | McFarland | 192/3.3 X |
| 2,793,726 | 5/1957 | Jandasek | 192/3.28 |
| 2,824,631 | 2/1958 | De Lorean | 192/3.3 |
| 3,497,043 | 2/1970 | Leonard | 192/3.28 |
| 4,027,757 | 6/1977 | Radke et al. | 192/106.2 |

FOREIGN PATENT DOCUMENTS 1042818  9/1966  United Kingdom .

*Primary Examiner*—George H. Krizmanich
*Attorney, Agent, or Firm*—Schwartz, Jeffery, Schwaab, Mack, Blumenthal & Koch

[57] ABSTRACT

A lock-up torque converter comprises a torque converter assembly and a lock-up clutch, wherein the clutch provides a direct drive between the engine and transmission of a vehicle in high gear. A damper is located in a limited space between a clutch piston and a turbine runner to provide a driving connection. The damper includes a portion secured to a hub for the turbine runner, such as by fastening pins.

5 Claims, 5 Drawing Figures

LOOK-UP TORQUE CONVERTER WITH COMPACT ARRANGEMENT OF DAMPER

BACKGROUND OF THE INVENTION

The present invention relates to a lock-up torque converter and more particularly to a compact arrangement of a damper which provides a driving connection between a lock-up clutch piston and a turbine runner.

A vehicle installed with a torque converter will show a poor fuel economy because of the fact that any fluid coupling experiences some degree of slip. A various kinds of lock-up torque converters have been proposed in which a torque converter locks up by means of a built-in clutch in a predetermined (high speed) operating range of a vehicle when torque variation of an engine is not experienced as a problem.

In a known lock-up torque converter, a damper for providing a driving connection between a clutch piston and a turbine runner is located in a space available between an outer periphery of the clutch piston and an outer periphery of the turbine runner and it is drivably connected at an inlet element thereof to the clutch piston and at an outlet element thereof to the turbine runner.

A problem with this damper arrangement is that since the damper is spaced radially outwardly from the axis of rotation about which the clutch piston and the turbine runner rotate by a considerable amount, the damper is thrown outwardly with such a large centrifugal force as to induce malfunction of the damper the vehicle operates at high speeds.

In another known lock-up torque converter, a damper is located between an inner periphery of a clutch piston and an inner periphery of a turbine runner.

A problem with this known arrangement is that since the damper is spaced radially outwardly from the rotation axis by a relatively small amount as compared to the damper arrangement mentioned before, a large damper has to be provided so as to afford to carry or transmit a large amount of torque and it requires complicated construction to drivably connect the damper to the turbine runner, as a result of which the entire axial length of this known arrangement becomes long.

SUMMARY OF THE INVENTION

It is therefore an object of the invention to provide a simple and space saving construction for drivably connecting a damper to a turbine runner.

DESCRIPTION OF THE PREFERRED EMBODIMENTS

Figure 1:
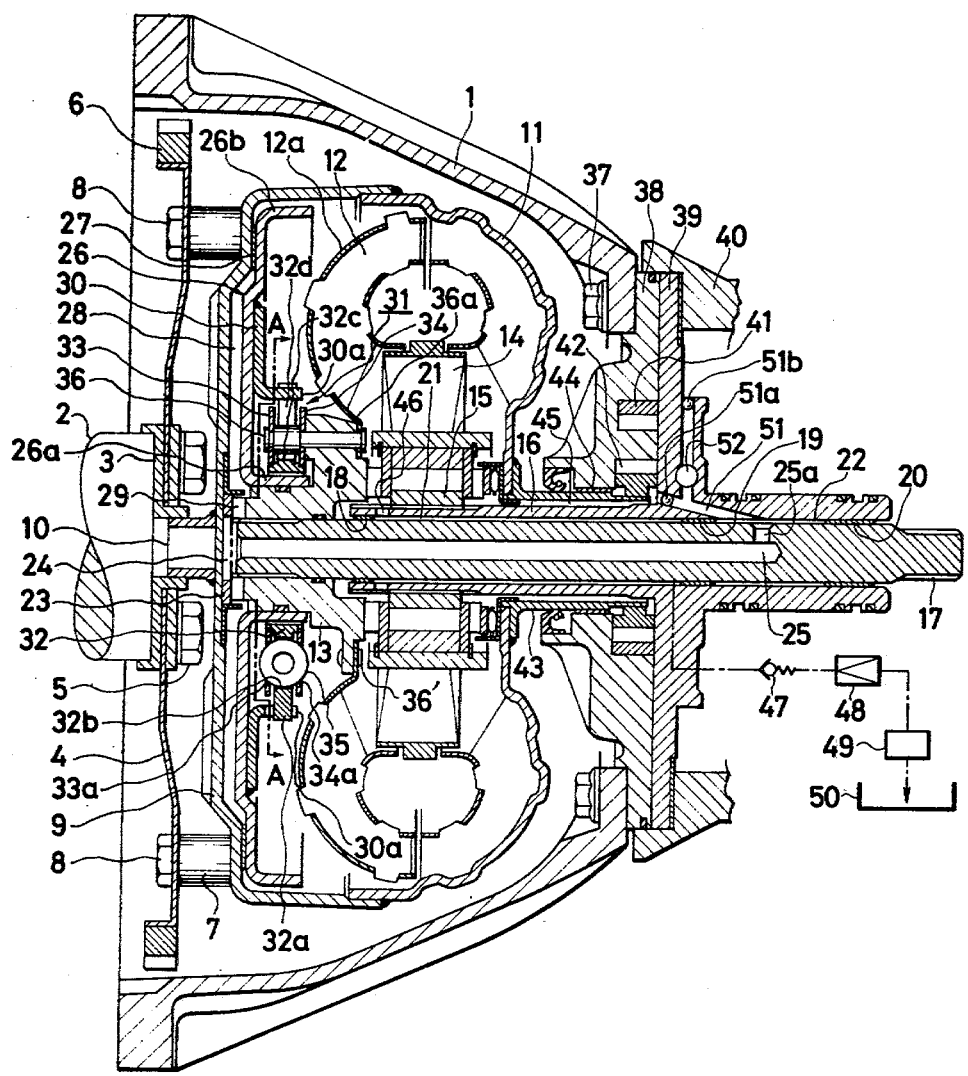
FIG. 1 is a longitudinal sectional view of a lock-up torque converter according to the present invention.

Referring to FIG. 1, the reference numeral 1 designates a converter housing and the reference numeral 2 a crankshaft. A boss 3 and a drive plate 4 are concentrically secured to the end of the crankshaft 2, such as, by means of a plurality of fasteners 5. Drive plate 4 carries at its outer periphery a ring gear 6. Drive plate 4 is drivably connected to a converter cover 9 concentrically by means of a plurality of fasteners 8 using the corresponding number of spacers 7. A sleeve 10 is secured to the central portion of the converter cover 9. Sleeve 10 is received in boss member 3 and thus the converter cover 9 is centered with respect to crankshaft 2. Converter cover 9 has a cylindrical shape having a closed end wall adjacent the drive plate 4 and an open end. To the outer periphery of the converter cover 9 adjacent the axial end defining the open end thereof, a pump impeller 11 is secured by welding so as to be coupled with the converter cover 9. A turbine runner 12 is secured to a hub 13 at a flange thereof by rivetting. A stator 14 is situated between the pump impeller 11 and the turbine runner 12 to form a torque converter. Stator 14 is mounted to a hollow stationary sleeve 16 through a one-way clutch 15.

The stationary sleeve 16 permits an output shaft 17, which may be a transmission input shaft, to extend therethrough with an annular space or play between them. Between the stationary sleeve 16 and the output shaft 17 three spacers (bushings) 18, 19 and 20 are disposed axially spaced one after another to divide the annular space into two annular chambers 21 and 22. The hub 13 for the turbine runner 12 is splined to the output shaft 17. Between the closed end wall of the converter cover 9 and its adjacent axial end of the hub 13, an annular member or spacers 23 is disposed to define a chamber 24. This chamber 22 communicates with the annular chamber 22 through an axial opening 25 formed in the output shaft 17 and through a radial opening 25a.

A generally annular clutch piston 26 is slidably mounted on the hub 13 on an annular portion thereof. An annular clutch facing 27 is attached to the adjacent surface of the clutch piston 26 on the converter cover 9. When the clutch facing 27 of the clutch piston 26 engages with the adjacent surface of the end wall of the converter cover 9 upon engagement of the clutch, a chamber 28 is formed between the converter cover 9 and the clutch piston 26. This chamber 28 communicates with the chamber 24 through radial grooves 29 formed at one axial end of the hub 13. Secured to the remote end wall of the clutch piston 26 is an annular mounting member 30. Within a limited space available between the inner periphery of the turbine runner 12 and the inner periphery of the clutch piston 26 a damper 31 is operatively connected between the clutch piston 26 and the hub 13 to provide a driving connection.

Figure 2:
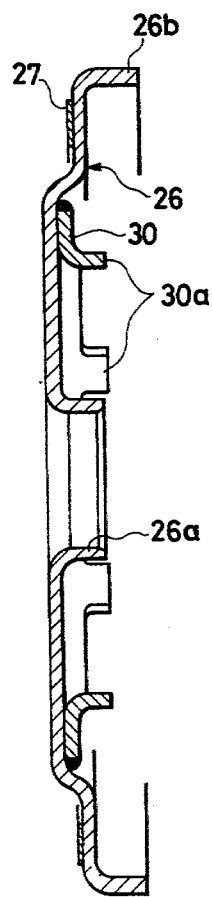
FIG. 2 is a cross sectional view of a clutch piston and an annular mounting member secured thereto.
Figure 3:
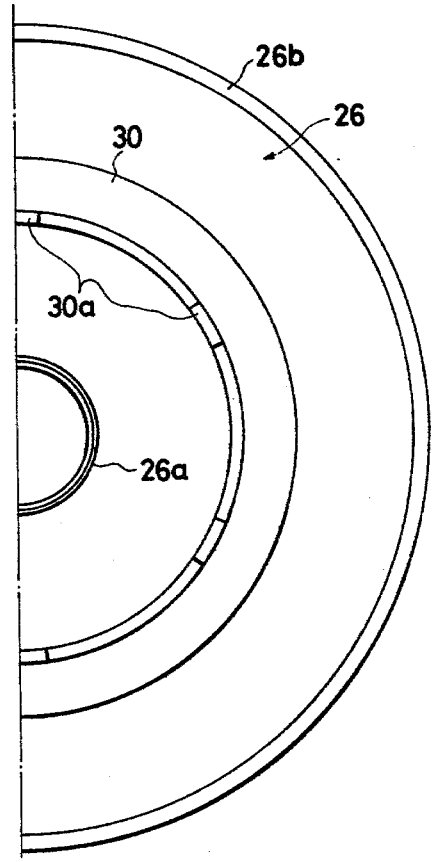
FIG. 3 is a top plan view, only half shown, of the clutch piston as viewed from the right hand side of FIG. 2.

Referring to FIGS. 2 and 3, the construction of the clutch piston 26 and that of the annular mounting member 30 will be described hereinafter. The clutch piston 26 is die formed from a piece of plate metal and includes a inner axially extending flange 26a and an outer axially extending, in the same direction, flange 26b. The clutch piston 26 is slidably mounted by the inner axially extending flange 26a on the hub 13. The outer axially extending flange 26b is formed for reinforcement purpose of the annular portion of the clutch piston 26 which will be subjected to difference, in pressure, upon engagement of the lock-up clutch. The annular mounting member 30 has a plurality of inner axially extending circumferentially spaced mounting legs 30a.

The damper 31 includes a sleeve 32 and a flange 32a radially extending from the sleeve 32. It also includes a plate assembly including a pair of plates 33 and 34 disposed on opposite sides of the flange 32a and spaced therefrom. The flange 32a and plates 33 and 34 have a plurality of openings 32b, 33a and 34a (see FIGS. 1 and 4) and a spring 35 is disposed in each set of these openings. The flange 32a has a plurality of second openings 32c (see FIGS. 1 and 4). A plurality of torque transmitting fasteners in the form of rivets 36 provide a driving connection between the plates 33 and 34. One of these rivets 36 extends through each of the second openings 32c of the flange 32a to act as a limit stop between the flange 32a and the plates 33 and 34.

The sleeve 32 and the plates 33 and 34 has openings receiving the inner axially extending flange 26a of the clutch piston 26, as best seen in FIG. 1. It will be noted that the damper 31 is arranged concentrically with and above the inner axially extending flange 26a of the clutch piston 26.

Figure 4:
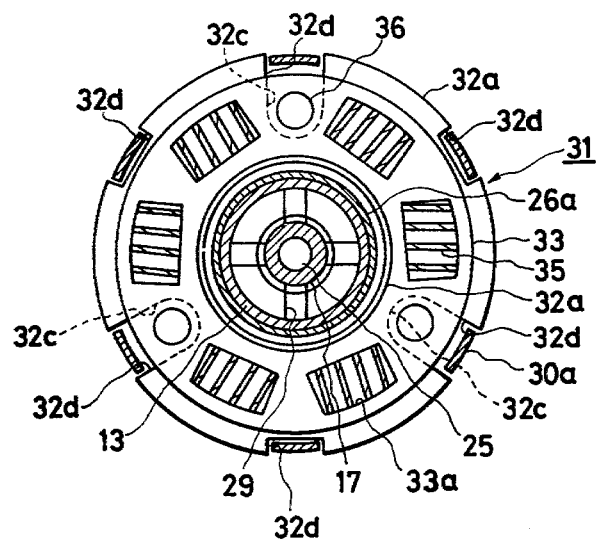
FIG. 4 is a sectional view taken through line A—A of FIG. 1 showing a damper as installed.

The damper 31 includes the annular mounting member 30 secured to the clutch piston 26. The flange 32a of the damper 31 has a plurality of circumferentially spaced outwardly opening notches 32d, one receiving each of the mounting member 30 of the annular mounting legs 30a (see FIGS. 1 and 4). If desired, some or all of the notches 32d may open to the second openings 32c, as shown in FIG. 4.

With the rivets 36, the plate 34 is secured to the hub 13 to provide a driving connection between the plate assembly of the damper 31 and the hub 13.

As shown in FIG. 1, a small diameter portion 36a of each of the rivets 36 extends through the plate 34, the hub 13 and the inner peripheral portion of the outer shell 12a of the turbine runner 12. The projecting axial end of each of the small diameter portions 36a are caulked to secure a unitary rotation between the plates 33 and 34, the hub 13 and the turbine runner 12. In the case that the connection between the hub 13 and the outer shell 12a is not sufficient, another plurality of rivets 36' may be employed (see FIG. 1).

The remote open end of the converter housing from the crankshaft 2 is secured to a pump housing 38 which in turn is secured to a pump cover 39 secured to a transmission case 40 by means of fasteners 37. The pump cover 39 extends radially from the stationary sleeve 16. Within the pump housing 38, oil pump elements including an outer gear 41 and an inner gear 42 are operatively disposed. A pump driving sleeve 43 extends into the pump housing 38 and journalled thereby by means of a bushing 44. The pump driving sleeve 43 permits the stationary sleeve 16 to extend therethrough, and has one axial end drivingly connected to the pump impeller 11 and has an opposite end splined to the inner gear pump element 42. Since the pump driving sleeve 43 is spaced from the stationary sleeve 16, an annular oil passage 45 is formed between them. This passage 45 at its one end communicates with the inside of the torque converter assembly and at an opposite end thereof communicates with a source of torque converter operating oil via a suitable passage structure formed in the pump cover 39.

The inside of the turbine runner 12 communicates with the annular chamber 21 by a radial passage 46 formed through the stationary sleeve 16. This annular chamber 21 communicates with a pressure maintaining valve 47 which in turn communicates with an oil cooler 48 communicating in turn with an oil reservoir 50 via various parts 49 which require lubrication. The annular chamber 22 communicates with a lock-up control valve 52 through an oil passage 51 (where the reference numerals 51a and 51b designate fit-in bails). The lock-up control valve 52 has the function to selectively connect the oil passage 51 to the source of torque converter operating oil or the oil reservoir 50.

The torque converter constructed thus far will operate as follows:

The rotation of the crankshaft 2 is always delivered to the pump impeller 11 through the drive plate 4, the fasteners 8 and the converter cover 9. The rotation of the pump impeller 11 is delivered through the pump driving sleeve 43 to the pump element inner gear 42.

When the vehicle operating condition does not satisfy a predetermined condition in which lock-up clutch engagement is required, the lock-up control valve 52 permits the oil passage 51 to communicate with the discharge side of the source of torque converter operating oil. Meanwhile oil is supplied from the source of torque converter operating oil to the inside of the pump impeller 11. The source of torque converter operating oil includes the oil pump 41, 42 and the pressure regulator valve, not shown.

The oil in the inside of the torque converter assembly flows out of the turbine runner 12. The oil discharged from the turbine runner 12 flows through the radial passage 46 and the annular chamber 21 to the pressure maintaining valve 47 thus the pressure within the torque converter assembly being maintained at a certain level determined by the pressure maintaining valve 47. This pressure, i.e., the pressure within the torque converter assembly, is transmitted through the lock-up control valve 52, the passages 51 and 25, the chamber 24 and radial passage 29 to the clutch chamber 28. Thus, the clutch piston 26 is held disengaged from the converter cover 9 when the chamber 24 is pressurized.

Under this condition, the torque converter will perform its torque multiplying function because the oil maintained at the certain pressure will transmit the torque under the reaction of the stator 14 from the pump impeller 11 to the turbine runner 12. The rotation of the turbine runner 12 is transmitted to the output shaft 17 through the hub 13. Through the output shaft 17 the engine power may be delivered to the gear train of the associated transmission.

The oil after flowing through the pressure maintaining valve 47 will flow to the oil cooler 48 installed within the lower tank of the radiator. After being cooled by the oil cooler 48, the oil will be distributed to the various parts or portions to be lubricated in the transmission and thereafter flow back to the oil reservoir 50, i.e., the oil pan of the transmission. The oil pump including the gears 41 and 42 will draw oil from this oil reservoir 50.

When the vehicle operating condition satisfies the predetermined condition, for example when the vehicles operates at speeds above a predetermined speed in the highest gear, the lock-up control valve 52 will change over to cause the oil passage 51 to connect with the drain passage 67 that leads to the oil reservoir 50. This connection will cause the oil within the clutch chamber 28 to be exhausted through the radial passage 29, the chamber 24, the oil passage 25, the oil passage 51 and through the lock-up control valve 52 so that the clutch piston 26 will be urged toward the left (viewing in FIG. 1) to engage with the converter cover 9 under the influence of the difference in pressure created between the both sides of the clutch piston 26. When the clutch facing 27 attached to the clutch piston 26 firmly engages with the converter cover 9, the piston 26 will be directly connected to the converter cover 9 which in turn is connected to the crankshaft 2 and the pump impeller 11 to rotate with them as a unit. The rotation of the clutch piston 26 is transmitted to the turbine runner 12 mechanically through the annular mounting member 30, the legs 30a, the flange 32a, the springs 35 and the plates 33 and 34. The impact upon initiation of the transmission of the rotational torque will be absorbed by the springs 35. Thus, the damper 31 will transmit the torque while suppressing the impact which otherwise would take place upon change in magnitude of the torque transmitted therethrough. In this manner, the turbine runner 12 is directly connected to the crankshaft 2 and the pump impeller 11 through the damper 31, the clutch piston 26 and the converter cover 9.

Since the damper 31 is operatively disposed within a limited space available adjacent the inner periphery of the clutch piston 26, the problem that a damper will not perform its designed function under the influence of the centrifugal force under high speed engine speeds will be avoided.

Since, with the rivets 36 used in the damper 31, the damper 31 is secured to the turbine runner 12 by fastening the plate 34 to the hub 13 for the turbine runner 12, a driving connection between the damper 31 and the turbine runner 12 has been simplified.

If the rivets 36 are to be used also as means for interconnecting the turbine runner 12 and the hub 13, the number of rivets 36' which are used to interconnect the turbine runner 12 and the hub 13 may be reduced, thereby to reduce the number of process of interconnecting the turbine runner 12 and the hub 13.

Figure 5:
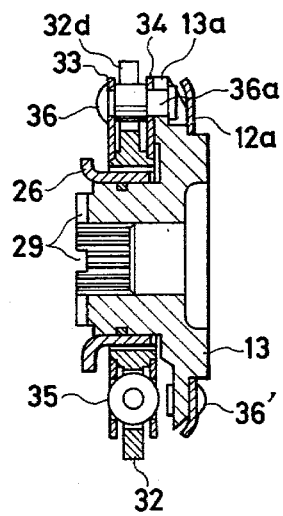
FIG. 5 is a partial sectional view of a damper as installed showing another embodiment of the invention.

Of course, if desired, the rivets 36 may not be used for interconnecting the turbine runner 12 and the hub 13, as shown in FIG. 5. In the embodiment shown in FIG. 5, the rivets 36 are used for securing the damper 31 to the hub 13, and the interconnection between the hub 13 and the turbine runner 12 is carried out by rivets 36' alone.

What is claimed is:

1. In a lock-up torque converter:
   a torque converter assembly including an output shaft, a hub receiving said output shaft to provide a driving connection, a turbine runner with an outer shell drivingly connected to said hub;
   a generally annular clutch piston slideably mounted on said hub;
   a damper operatively connected between said clutch piston and said hub to provide a driving connection, said damper including a portion secured to said hub;
   said damper including a sleeve and a flange radially extending from said sleeve;
   said damper also including a plate assembly including a pair of plates disposed on opposite sides of said flange and spaced therefrom;
   said flange and said plates having a plurality of openings;
   said damper including a spring disposed in each of said openings;
   said flange having a plurality of second openings;
   said damper including a plurality of torque transmitting fasteners providing a driving connection between said plates, one of said fasteners extending through each of said second openings of said flange to act as a limit stop between said flange and said plates; and
   each of said fasteners having a portion extending into said hub to provide a driving connection between said plate assembly and said hub.

2. A lock-up torque converter as claimed in claim 1, in which
   said fasteners extend through an inner portion of said outer shell of said turbine runner to provide a driving connection between said turbine runner and said hub.

3. A lock-up torque converter as claimed in claim 2, in which
   each of said fasteners is in the form of a rivet.

4. A lock-up torque converter as claimed in claim 1, in which
   said clutch piston has an inner axially extending flange, said clutch piston being slidably mounted by said inner axially extending flange on said hub, and
   said sleeve and said plates of said damper having an opening receiving said inner axially extending flange of said clutch piston.

5. A lock-up torque converter as claimed in claim 1, in which
   said damper includes an annular mounting member secured to said clutch piston and having a plurality of axially extending circumferentially spaced mounting legs;
   said flange of said damper has a plurality of circumferentially spaced outwardly opening notches, one receiving each of said mounting legs.

* * * * *